United States Patent [19]

Edling

[11] 4,302,655
[45] Nov. 24, 1981

[54] METHOD AND DEVICE FOR ADAPTIVE CONTROL OF THE WELD PARAMETERS IN AUTOMATIC ARC WELDING PROCESSES

[75] Inventor: Lars G. Edling, Mölndal, Sweden

[73] Assignee: Institutet for Verkstadsteknisk Forskning IVF, Gothenburg, Sweden

[21] Appl. No.: 50,424

[22] Filed: Jun. 20, 1979

[30] Foreign Application Priority Data

Jun. 22, 1978 [SE] Sweden .............................. 7807161

[51] Int. Cl.³ .............................................. B23K 9/10
[52] U.S. Cl. .......................... 219/130.32; 219/125.12; 219/137 R
[58] Field of Search ...................... 219/124.23, 124.22, 219/125.11, 125.12, 137 R, 130.32, 130.21, 130.31

[56] References Cited

U.S. PATENT DOCUMENTS

| 3,855,446 | 12/1974 | Kotova et al. ................. 219/124.34 |
| 4,151,395 | 4/1979 | Kushner et al. ................. 219/124.34 |

FOREIGN PATENT DOCUMENTS

| 2631250 | 2/1977 | Fed. Rep. of Germany ........................ 219/124.22 |
| 2546894 | 4/1977 | Fed. Rep. of Germany ........................ 219/124.22 |
| 2741728 | 3/1979 | Fed. Rep. of Germany ........................ 219/124.34 |

*Primary Examiner*—C. C. Shaw
*Attorney, Agent, or Firm*—Harness, Dickey & Pierce

[57] ABSTRACT

A method and a device for adaptive control of the weld parameters in automatic arc welding processes to weld together two workpieces. The arc is arranged to oscillate in the transverse direction of the groove and by measuring the welding current and/or welding voltage on two separate occasions during the deposition of the root run characteristic values are obtained. The values obtained on these two occasions are combined mathematically with a calculated rated value. This rated value corresponds to the height of the root bead of the weld. The discrepancy of the obtained values from the calculated rated value is used to control means arranged to set the weld parameters, thus ensuring that a homogeneous weld is obtained, irrespective of groove variations, such as variations in the gap width between the two workpieces, or variations of other factors affecting the weld.

11 Claims, 7 Drawing Figures

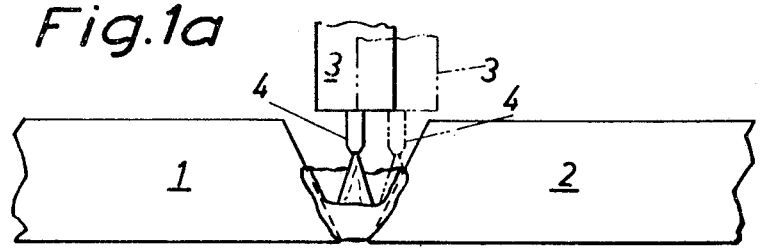
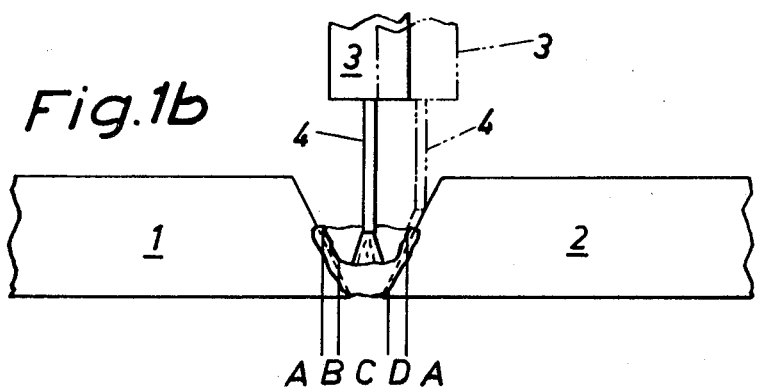
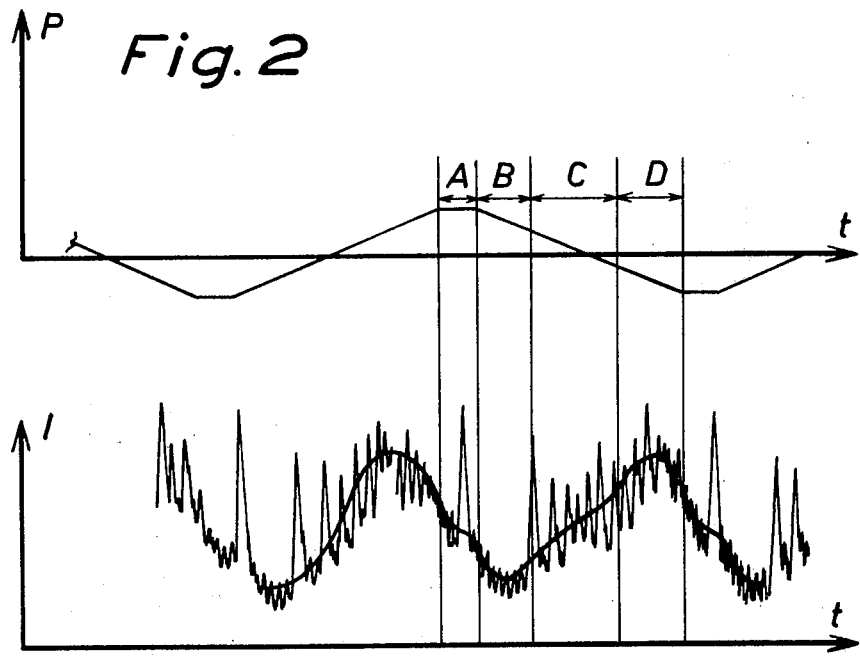

METHOD AND DEVICE FOR ADAPTIVE CONTROL OF THE WELD PARAMETERS IN AUTOMATIC ARC WELDING PROCESSES

BACKGROUND OF THE INVENTION

The invention concerns a method in automatic arc welding of regulating the weld parameters of a weld joint between two workpieces, said method comprising deriving a characteristic value from electrical quantities of the arc at least on two separate occasions, which arc is made to oscillate across the groove between the workpieces, thereafter combining mathematically the values obtained on these occasions and comparing the result thus obtained with a rated value, i.e. the most favourable value, the departure of said obtained result from said rated value being used to affect means to set the weld parameters so as to ensure that the departure is maintained at a minimum value.

The purpose of the subject invention is to provide a method of controlling the weld parameters in the welding together of two workpieces to ensure that a homogeneous weld with an optimum root bead is obtained also when the distance separating the two workpieces or other factors affecting the weld vary.

To obtain an acceptable weld in automatic arc welding, it is necessary in welding root beads that the weld parameters are adjusted to the dimensions of the weld, particularly to the gap width. Automatic welding has hitherto been effected with fixed weld parameters, and consequently the demands on groove exactness have been high. These demands are often difficult to meet, both from a technical and an economical point of view.

It is consequently desirable to adjust the weld parameters to the groove, or in other words to control the weld parameters adaptively. The weld parameters usually are the electrode speed, the current intensity, alternatively wire feed speed, the tension and, in case of oscillation, the amplitude. Control may be effected by measuring the dimensions of the weld but that method requires separate transducers. However, in practice separate transducers are difficult to use. They are exposed to sprays, radiation and heat, all of which reduces their performance and serviceability. In welding grooves that are in not easily accessible positions, the groove cannot either be measured while the welding is in progress. By using the electrical arc proper as a transducer the disadvantages outlined above may be eliminated.

One example of the use of the arc as a transducer is shown by the groove sensing principle disclosed in DE OS No. 26 31 250. In accordance with the teachings of this publication the arc is oscillated in the groove and the electrical quantities at the extremes are compared. In automatic welding operations groove sensing alone is often not enough, however, but as mentioned above adaptive control of the weld parameters is also necessary. One example of such control while using the arc as the transducer is described in U.S. 3 233 076. However, this prior-art method requires that the welding head is maintained at an exact and constant distance from the groove, which requires separate transducers and therefore causes the disadvantages mentioned above.

The subject invention has for its purpose to provide a method in which the disadvantages outlined above are eliminated.

SUMMARY OF THE INVENTION

The invention is characterised by measuring the welding current and/or the welding voltage on two separate occasions during the deposition of a root run, combining mathematically the value measured on one of these occasions with the value measured on the second one of these occasions, comparing the result thus obtained with a calculated rated value corresponding to the height of the root bead of the weld, and using a signal corresponding to the departure of the calculated result from the calculated rated value to control means arranged to set the weld parameters.

In accordance with the teachings of the subject invention the arc itself thus is used as a transducer and the weld parameters are controlled by determining the position of the melt in relation to the groove directly in that the arc burns not only against the melt but at predetermined intervals is also made to burn against the groove edges, whereby the above-mentioned characterising values are derived.

In accordance with a preferred embodiment the welding is effected by means of a constant current power set, such as tungsten gas arc welding, and the arc movements are effected either magnetically or by continuously oscillating the welding head across the groove. The arc length varies between a maximum value when the arc is burning against the melt, and a minimum value when the arc is burning against one of the groove faces. By measuring the electric quantities of the arc in the middle and in the extreme positions, respectively, the arc length variation and therefore the position of the melt in the groove as well as the size of the root bead may be determined. If the latter is too large or too small with relation to the groove and the relevant weld parameters, the latter are corrected.

In accordance with another preferred embodiment, the welding is effected by means of a power set having constant voltage characteristics and with an arc known as self-regulating, such as conventional metallic gas arc welding, and the arc movements are effected by oscillating the welding head continuously in the transverse direction of the groove. In accordance with this technique the electrode stick-out varies between a maximum value, when the arc is burning against the melt, and a minimum value, when the arc is burning against the groove faces. The change of electrode stick-out and therefore the size of the root bead may be determined by comparing the electrical quantities of the arc in the middle and the respective end position. Considering that this welding method is comparatively instable the minute differences are difficult to register. The change of stick-out does, however, give rise to large dynamic variations in the current, more precisely high current when the stick-out is reduced and low current when the stick-out increases.

One measure of the size of the root bead is derived from the difference between the highest and the lowest values of the current during half an oscillating cycle. When the root bead is too large or too small with regard to the groove and the relevant weld parameters, the latter are changed.

In accordance with yet another preferred embodiment the characteristic values are derived upon deflection towards both groove sides and the average value obtained as a result is calculated for the purpose of reducing the effects of any lateral deviation of the electrode in the groove.

BRIEF DESCRIPTION OF THE DRAWINGS

The invention will be described in the following with reference to one embodiment thereof shown in the accompanying drawings, wherein FIG. 1a illustrates schematically the application of the invention when used with a non-consumable electrode, FIG. 1b its application when used with a consumable electrode which is oscillated in the transverse direction of the groove, FIG. 2 illustrates in a time sequence the interaction between oscillation and the dynamic variation of the welding current upon metallic gas arc welding.

DETAILED DESCRIPTION OF A PREFERRED EMBODIMENT

Figure 3A:
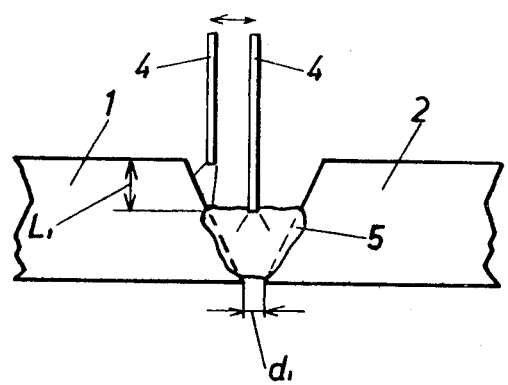
FIGS. 3a–3c illustrate, in the case of metallic gas arc welding, various examples of the configuration of the melt as well as the size of the root bead and the variation of the electrode stick-out for different gap widths.

In metallic gas arc welding in accordance with the subject invention are utilized the dynamic current variations occurring when the arc is oscillated across the groove to determine the position of the melt in the groove.

FIG. 1b illustrates schematically the welding together of two workpieces 1 and 2 by means of metallic gas arc welding. The welding head is designated by reference numeral 3 and the electrode by 4.

FIG. 2 shows on the one hand the oscillating position P as a function of time and on the other the variations of the welding current with time.

During the oscillation, the following phases may be distinguished:

A. The arc remains immobile or comparatively immobile in the extreme position. The stick-out is constant and the current is medium high.
B. The arc projects below the groove edge. The stick-out increases and the current is low.
C. The arc passes beyond the middle of the weld. The stick-out is comparatively constant and the current is medium high.
D. The arc reaches up the edge. The stick-out is reduced and the current is high.

The difference between the highest and the lowest values of the filtered current is the current difference. The filtered current is indicated in FIG. 2 by a continuous line but in practice there is a slight phase shift.

Figure 3B:
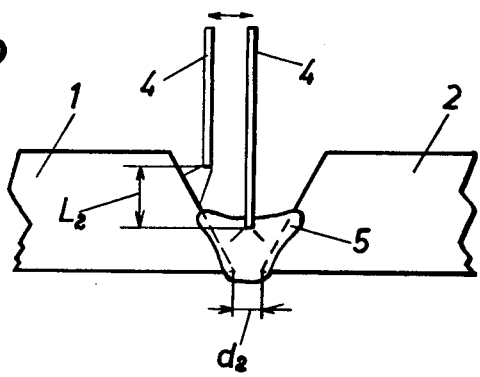
Figure 3C:
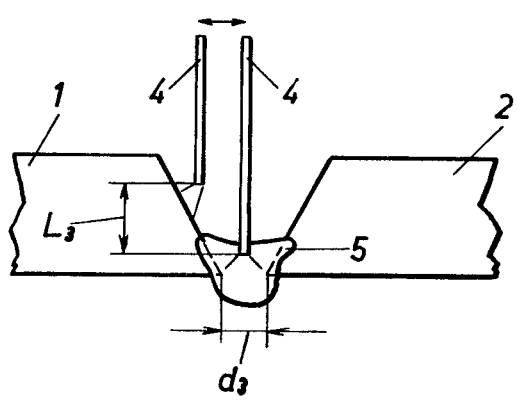

When a groove having certain weld parameters is welded and when the gap varies, the size of the root bead will vary as shown in FIGS. 3a–3c. This means that also the variation of the stick-out is altered.

FIGS. 3a, 3b and 3c illustrate the size of the root bead 5' and the stick-out variations for different gap widths $d_1$, $d_2$ and $d_3$ wherein $d_1 < d_2 < d_3$.

The difference in stick-out of the electrode in the middle position and one extreme position is indicated in the figures by $L_1$, $L_2$ and $L_3$ wherein $L_1 < L_2 < L_3$.

In the situation illustrated in FIG. 3a, the root is not sufficiently melted. When the weld is adequately melted, the weld seam 5 is in the position illustrated in FIG. 3b. FIG. 3c illustrates the position when the root bead is too large and burn-through is imminent.

The extent of the variation of the stick-out has an effect on the difference in current. When the extent of the melt is optimum a predetermined difference in current is registered and consequently a smaller difference in current is registered, when the extent of the melt is insufficient and a larger difference when the melt is in excess.

Figure 4:
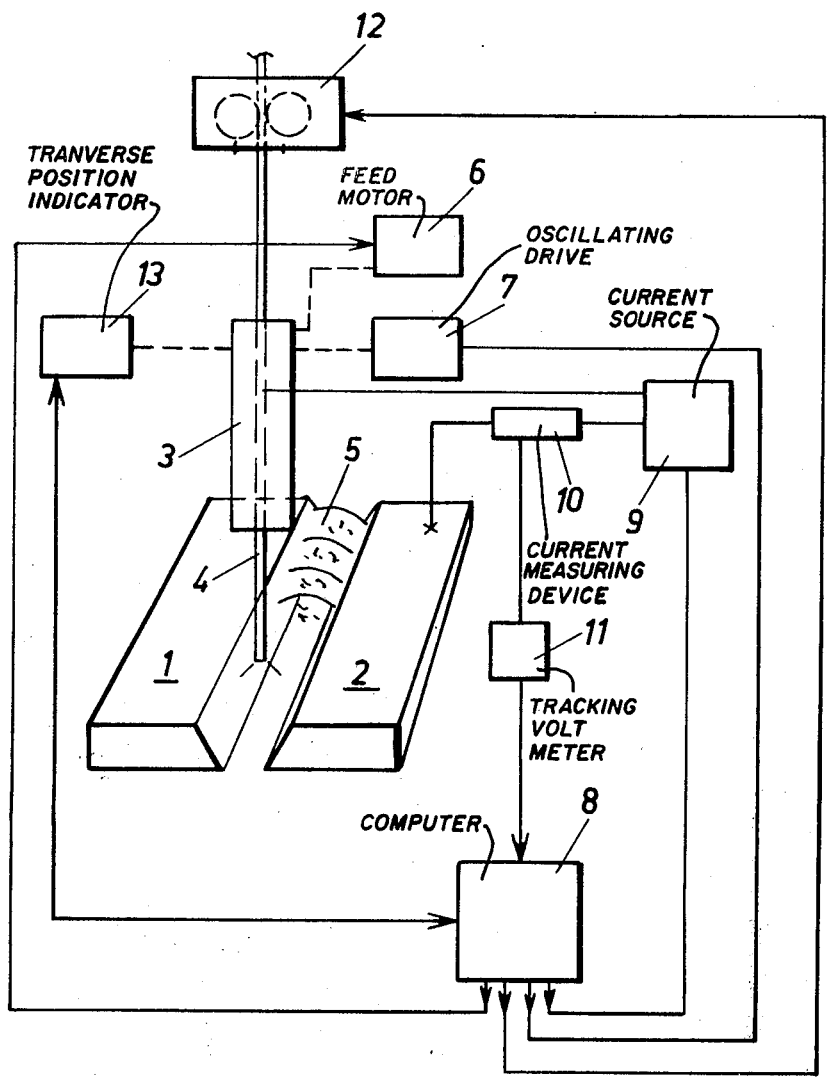
FIG. 4 illustrates a device designed to carry out the method in accordance with the invention.

FIG. 4 is a schematic representation of a device in accordance with the subject invention, designed to control a welding process.

The workpieces intended to be welded together are designated by numerals 1 and 2. The welding head 3 and its electrode 4 are arranged to be advanced along the groove by a travel motor 6. A second motor 7 is arranged to impart oscillating movements to the welding head backwards and forwards across the groove, while the welding head is simultaneously advanced along the groove. Via control wires, the motors are connected to a computer 8, preferably a micro-computer, which is arranged to control the welding process.

The electrode is energized from a source of current 9 which is connected to the computer via a control wire.

The current is measured by a current measuring instrument 10 in the form of a shunt or a Hall generator. If required, the signal is amplified and filtered to remove high-frequency interference and is converted into digital form by means of a rapid A/D converter 11, e.g. a tracking voltmeter. The digital signal is via a line supplied to the computer 8.

The electrode 4 is advanced forwards by means of a wire feed unit 12 which via a control wire is connected to the computer 8.

A transducer 13 supplies information to the computer 8 on the oscillating position.

The adaptive control of welding data is based on the registration of the difference in current upon variation of stick-out and on the comparison of this difference with rated values regarding the relevant weld parameters. If the difference in current exceeds the rated value the root bead 5' is too large and the weld parameters are corrected to reduce the root bead. When the difference in current drops below the rated value, the root bead 5' is too small and the weld parameters are corrected to increase it.

Weld data for various gap widths, e.g. ranging between 0 and 4.0 mm. in increments of 0.4 mm. are stored in the computer. Before the welding, the gap width at the beginning of the groove is fed into the computer and when the welding begins the weld parameters relative to this gap width control the welding. The weld parameters are thereafter controlled adaptively. The computer reads the current at brief intervals, e.g. at every 2nd millisecond. The difference in current is computed after each semi-oscillation. A mean value computation of the latest differences as measured is made. The mean value of the differences is compared at regular intervals, e.g. after each third semi-oscillation, with the relevant rated value. Following a change of the weld data, longer periods must pass, e.g. equivalent to three oscillations, in order to allow the new condition to stabilize before a comparison is carried out. In case the difference exceeds the rated value, the weld parameters are corrected to the data having reference to one gap width above the present data, e.g. from weld parameters relating to gaps of 2.0 mm. to weld parameters relating to gaps of 2.4 mm. When the difference is less than the rated value the weld parameters are corrected to data having reference to a gap width lower than the present one. The rated value of the difference in current for each weld parameter combination is determined either empirically or is computed in the computer as closely as possible.

The method and the device in accordance with the subject invention have been described above in connection with welding of a V-shaped groove with gap variations serving as interference. The principle and mode of operation are, however, identical in all fillet weld joints and butt weld joints (with the exception of I-joints) and other influential variations in the joint having the same effects as the gap variations.

What I claim is:

1. An improved method in automatic arc welding of regulating the weld parameters of a weld joint formed between two workpieces to control the amount of melt, said method comprising oscillating said arc from a longitudinally extending centerline in the transverse direction of the groove between said work pieces, deriving a characteristic value from electrical quantities of said arc at at least two separate locations in the transverse direction spaced at different transverse locations relative to the centerline to determine the height of melt achieved, thereafter combining mathematically said values obtained at these locations and comparing the result thus obtained with a rated value indicative of the desired height of melt, the departure of said result from said rated value being used to affect means arranged to set the weld parameters so as to ensure that said departure is maintained at a minimum value and the desired height of melt is maintained, the improvement comprising measuring the welding current at two separate transverse locations spaced different distances from the centerline during the deposition of a root run of the weld, combining mathematically the value thus measured on the first one of these locations with the value measured on said second one of said locations, comparing the result thus obtained with a calculated rated value, said value corresponding to the height of the melt of the root bead of the weld, and using a signal corresponding to the departure of said calculated result from said calculated rated value to control means arranged to set said weld parameters to maintain the desired melt height.

2. An improved method as claimed in claim 1, comprising measuring said welding current at a first transverse location when the base of said arc is positioned on the melt of the root run contiguous to the centerline and at a second transverse location when the base of said arc is positioned contiguous to one of the two sides of the groove.

3. An improved method as claimed in claim 1, comprising measuring said welding current at two transverse locations within half an oscillating cycle of said arc.

4. An improved method as claimed in claim 3, said method being used in welding operations using a consumable electrode and a source of current showing low gradient load characteristics, the improvement comprising filtering a portion of said welding current through a low-pass filter, measuring said filtered portion of said welding current at a first transverse location when said portion is at its highest value and at a second transverse location when said portion is at its lowest value, thereafter forming the difference from said two values and comparing said difference with said calculated rated value.

5. An improved method as claimed in claim 4, comprising forming a first mean value from said highest values during each one of at least two consecutive oscillation semi-cycles, and forming a second mean value from said lowest values during each one of said semi-cycles, thereafter forming the difference from these two mean values and comparing said difference with said calculated rated value.

6. An improved method in automatic arc welding of regulating the weld parameters of a weld joint formed between two workpieces to maintain the desired melt height, said method comprising oscillating said arc in the transverse direction of the groove between said workpieces about a longitudinally extending centerline, deriving a characteristic value from electrical quantities of said arc at at least two separate transverse locations spaced different distances from said centerline, thereafter combining mathematically said values obtained at these transverse locations and comparing the result thus obtained with a rated value indicative of the desired melt height, the departure of said result from said rated value being used to affect means arranged to set the weld parameters so as to ensure that said departure is maintained at a minimum value and the melt height is maintained at the desired value, the improvement comprising measuring the welding voltage at two separate transverse locations during the deposition of a root run of the weld, combining mathematically the value thus measured at the first one of these transverse locations, comparing the result thus obtained with a calculated rated value, said value corresponding to the height of the root bead of the weld, and using a signal corresponding to the departure of the said calculated result from said calculated rated value to control means arranged to set said weld parameters to maintain the desired melt height.

7. An improved method as claimed in claim 6, comprising measuring said welding voltage at a first transverse location when the base of said arc is positioned on the melt of the root run contiguous to the centerline and at a second transverse location when the base of said arc is positioned contiguous to one of the two sides of the groove.

8. An improved method as claimed in claim 6, comprising measuring said welding voltage at two transverse locations within half an oscillating cycle of said arc.

9. An improved method as claimed in claim 8, comprising measuring said welding voltage at a first transverse location when said voltage is at a maximum value and at a second transverse location when said voltage is at a minimum value, and utilizing the difference in voltage values as said calculated result, the difference being compared with said calculated rated value.

10. An improved method as claimed in claim 9, comprising forming a first mean value by means of the highest welding voltage occurring during each one of at least two consecutive oscillating semi-cycles, and forming a second mean value by means of the lowest voltages occuring during each one of said semi-cycles, and thereafter forming the difference by means of said two mean values, which difference is compared with said calculated rated value.

11. An improved device designed to carry out a method in automatic arc welding to regulate the weld parameters of a joint between two workpieces to maintain the desired melt height by deriving a characteristic value from electrical quantities of said arc oscillating in the transverse direction of the groove between said workpieces about a longitudinally extending centerline, said device comprising a welding head supporting a welding electrode, a travelling mechanism designed to displace said welding head along said groove and said centerline, an oscillating device to oscillate said arc in the transverse direction of said groove, a source of welding current connected to said electrode and the respective workpiece, a transducer to sense the position of oscillation of said arc, and measuring means to measure the welding current and/or the welding voltage, the improvement comprising means for setting said weld parameters to control the melt height in response to an output signal from a registering mechanism for the purpose of ensuring a predetermined value of the height of the root run of the weld, input means connecting said registering mechanism to said measuring means and to said transducer, first means included in said registering means to combine mathematically two values measured at two separate transverse locations spaced different distances from the centerline by said measuring means, and second means to compare the calculated result with an adjustable calculated rated value, said latter value corresponding to the height of the melt of the desired root run, said output signal corresponding to the difference between said calculated result and said calculated rated value.

* * * * *